(12) United States Patent
Lee et al.

(10) Patent No.: US 8,958,850 B2
(45) Date of Patent: Feb. 17, 2015

(54) MOBILE TERMINAL AND CONTROL METHOD THEREOF

(75) Inventors: Hojoon Lee, Seoul (KR); Taehyung Kim, Seoul (KR)

(73) Assignee: LG Electronics Inc., Seoul (KR)

(*) Notice: Subject to any disclaimer, the term of this patent is extended or adjusted under 35 U.S.C. 154(b) by 483 days.

(21) Appl. No.: 13/102,702

(22) Filed: May 6, 2011

(65) Prior Publication Data

US 2012/0088554 A1    Apr. 12, 2012

(30) Foreign Application Priority Data

Oct. 8, 2010  (KR) ........................ 10-2010-0098413

(51) Int. Cl.
| | |
|---|---|
| H04M 1/00 | (2006.01) |
| H04B 1/38 | (2006.01) |
| G06F 3/048 | (2013.01) |
| G06F 3/0483 | (2013.01) |
| G06F 17/27 | (2006.01) |
| H04M 1/725 | (2006.01) |

(52) U.S. Cl.
CPC ...... *H04M 1/72522* (2013.01); *H04M 2250/16* (2013.01); *H04M 2250/22* (2013.01)
USPC ........... 455/566; 715/202; 715/203; 715/230; 715/751; 715/754

(58) Field of Classification Search
CPC . G06F 17/241; G06F 3/0483; G06F 3/04883; G06F 2203/04803; G06F 3/0482; G06F 3/04842; G06F 15/0291; G06F 17/24; G06F 1/1626; G06F 3/0487; H04L 67/1095; H04L 67/26
USPC ........... 715/202, 203, 230, 751, 754; 455/566
See application file for complete search history.

(56) References Cited

U.S. PATENT DOCUMENTS

| | | | | |
|---|---|---|---|---|
| 5,339,391 | A * | 8/1994 | Wroblewski et al. | 345/607 |
| 5,774,109 | A * | 6/1998 | Winksy et al. | 345/685 |
| 5,903,267 | A * | 5/1999 | Fisher | 715/786 |
| 6,331,866 | B1 * | 12/2001 | Eisenberg | 715/784 |
| 6,560,645 | B1 * | 5/2003 | Igawa et al. | 709/223 |
| 7,246,118 | B2 * | 7/2007 | Chastain et al. | 1/1 |
| 7,779,347 | B2 * | 8/2010 | Christiansen et al. | 715/230 |
| 8,520,025 | B2 * | 8/2013 | Patterson et al. | 345/619 |
| 8,543,941 | B2 * | 9/2013 | Patterson et al. | 715/810 |
| 8,555,195 | B2 * | 10/2013 | Piersol et al. | 715/787 |
| 2004/0064369 | A1 * | 4/2004 | Kato | 705/14 |
| 2008/0168073 | A1 * | 7/2008 | Siegel et al. | 707/100 |
| 2008/0184145 | A1 * | 7/2008 | Gould | 715/764 |
| 2008/0222156 | A1 * | 9/2008 | Ryan et al. | 707/10 |
| 2009/0054040 | A1 * | 2/2009 | van Wijk et al. | 455/412.1 |

(Continued)

FOREIGN PATENT DOCUMENTS

WO    WO 2008112038 A1 *  9/2008  ............. G06Q 30/00

*Primary Examiner* — Matthew Sams
(74) *Attorney, Agent, or Firm* — Birch, Stewart, Kolasch & Birch, LLP

(57) ABSTRACT

A mobile terminal and a control method thereof are provided. The mobile terminal includes a radio communication unit; a display displaying at least part of e-book contents; and a controller transmitting position information about the at least part of the e-book contents and a user's input relating to the at least part of the e-book contents to a server through the radio communication unit when acquiring the user's input. Accordingly, a user' input relating to part of the e-book contents can be transmitted to the server to share a user's opinion on the e-book contents.

10 Claims, 17 Drawing Sheets

(56) References Cited

U.S. PATENT DOCUMENTS

| | | | |
|---|---|---|---|
| 2009/0265447 A1* | 10/2009 | Lee et al. | 709/219 |
| 2010/0017371 A1* | 1/2010 | Whalin et al. | 707/3 |
| 2010/0031135 A1* | 2/2010 | Naghshin et al. | 715/230 |
| 2010/0083136 A1* | 4/2010 | Komine et al. | 715/753 |
| 2010/0325220 A1* | 12/2010 | Skinner et al. | 709/206 |
| 2011/0050594 A1* | 3/2011 | Kim et al. | 345/173 |
| 2011/0087955 A1* | 4/2011 | Ho et al. | 715/230 |
| 2011/0202825 A1* | 8/2011 | Volsky | 715/230 |
| 2011/0231474 A1* | 9/2011 | Locker et al. | 709/203 |
| 2012/0036423 A1* | 2/2012 | Haynes et al. | 715/230 |
| 2012/0046947 A1* | 2/2012 | Fleizach | 704/260 |
| 2012/0088554 A1* | 4/2012 | Lee et al. | 455/566 |
| 2012/0143590 A1* | 6/2012 | Ajima | 704/2 |
| 2012/0171653 A1* | 7/2012 | Kwon et al. | 434/317 |
| 2012/0173659 A1* | 7/2012 | Thaxter et al. | 709/217 |
| 2012/0192057 A1* | 7/2012 | Migos et al. | 715/230 |
| 2012/0218305 A1* | 8/2012 | Patterson et al. | 345/652 |
| 2012/0221936 A1* | 8/2012 | Patterson et al. | 715/230 |
| 2012/0221937 A1* | 8/2012 | Patterson et al. | 715/230 |
| 2012/0221938 A1* | 8/2012 | Patterson et al. | 715/232 |
| 2012/0221968 A1* | 8/2012 | Patterson et al. | 715/776 |
| 2012/0221972 A1* | 8/2012 | Patterson et al. | 715/810 |
| 2012/0311438 A1* | 12/2012 | Cranfill et al. | 715/256 |
| 2012/0324355 A1* | 12/2012 | Mbenkum et al. | 715/727 |
| 2013/0024544 A1* | 1/2013 | Oshita | 709/217 |
| 2013/0042171 A1* | 2/2013 | Yang et al. | 715/230 |
| 2013/0262973 A1* | 10/2013 | Patterson et al. | 715/205 |
| 2013/0305135 A1* | 11/2013 | Patterson et al. | 715/230 |
| 2013/0311867 A1* | 11/2013 | Patterson et al. | 715/230 |
| 2014/0033128 A1* | 1/2014 | Patterson et al. | 715/834 |

* cited by examiner

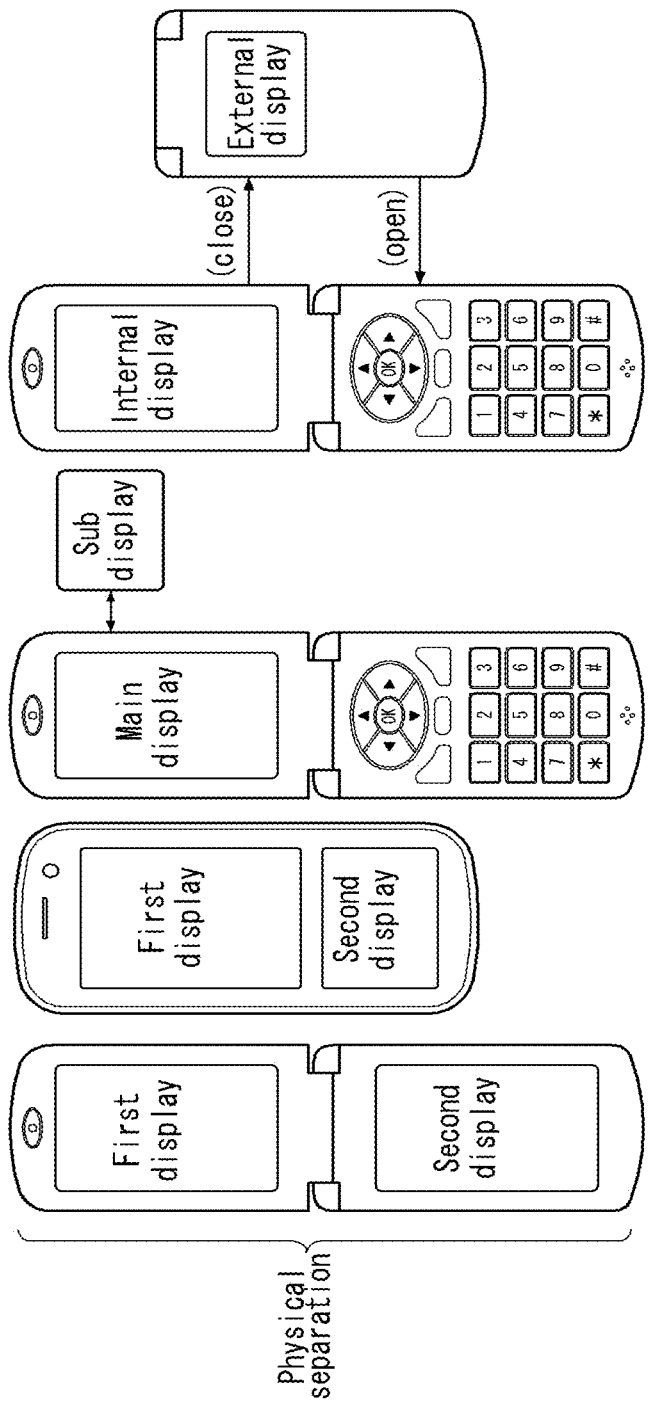

MOBILE TERMINAL AND CONTROL METHOD THEREOF

This application claims the benefit of Korean Patent Application No. 10-2010-0098413 filed on Oct. 8, 2010 which is hereby incorporated by reference.

BACKGROUND

1. Field of the Invention

The invention relates to a mobile terminal and a control method thereof and, more particularly, to a mobile terminal and a control method thereof to transmit a user's input relating to a part of e-book contents to a server to share a user's opinion on the e-book contents.

2. Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether users can personally carry the terminals.

To support and enhance functions of a terminal, it can be considered to improve a structural part and/or a software part of the terminal.

A variety of recent terminals including mobile terminals providing more complex and various functions.

SUMMARY

An aspect of the invention is to provide a mobile terminal and a control method thereof to transmit a user's input relating to a part of e-book contents to a server to share a user's opinion on the e-book contents.

BRIEF DESCRIPTION OF THE DRAWINGS

The accompanying drawings, which are included to provide a further understanding of the invention and are incorporated into and constitute a part of this specification illustrate embodiments of the invention and together with the description serve to explain the principles of the invention.

FIGS. 2C and 2D illustrate forms of the mobile terminal and display screens according to various embodiments of the invention;

DETAILED DESCRIPTION

The invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Hereinafter, a mobile terminal relating to the invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
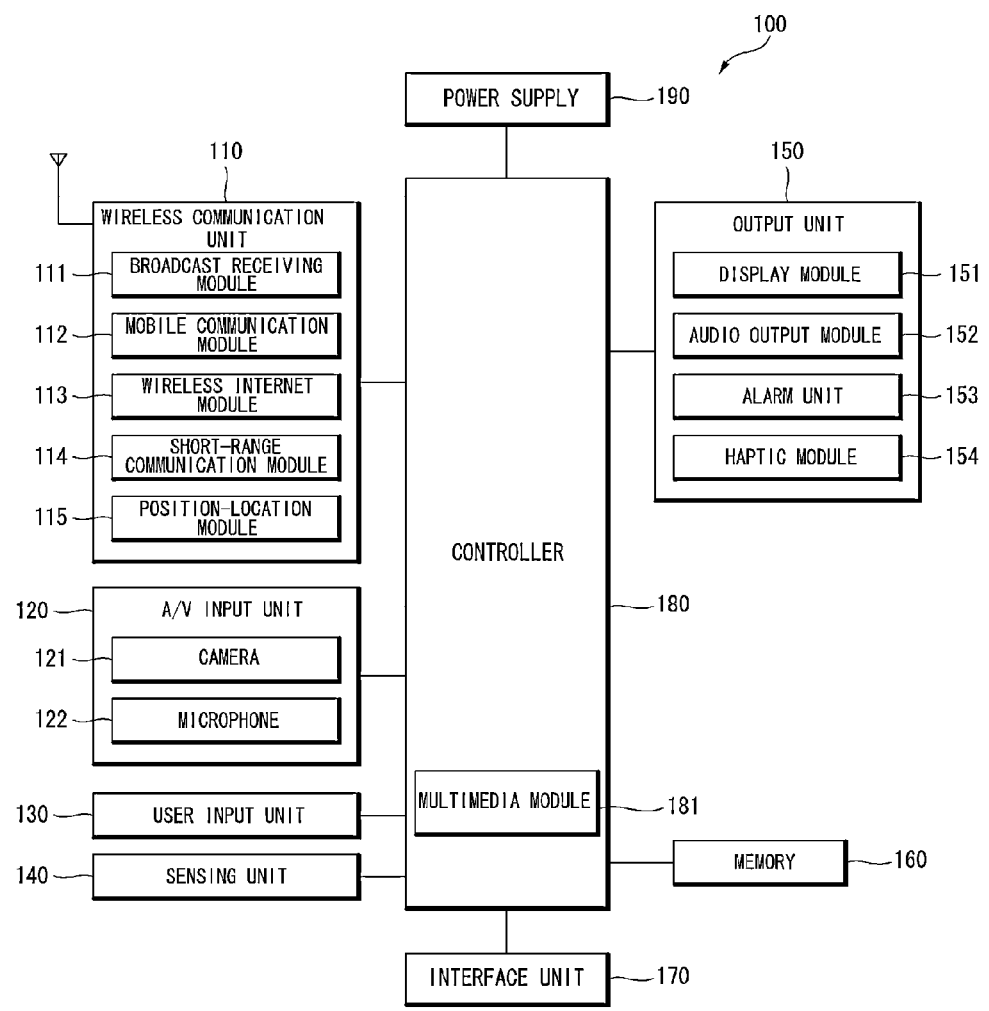
FIG. 1 is a block diagram of an implementation of a mobile terminal according to an embodiment of the invention.

FIG. 1 is a block diagram of an implementation of a mobile terminal 100 according to an embodiment of the invention. Other embodiments, configurations and arrangements may also be provided. As shown, the mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a location (or position) information module 115.

The broadcasting receiving module 111 may receive broadcasting signals and/or broadcasting related information from an external broadcasting management server through a broadcasting channel The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, Bluetooth®, radio frequency identification (RFID), infrared data association (IrDA), ultra wideband (UWB) and/or Zig-Bee® may be used as a local area communication technique.

The location information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 which may be a touch screen.

The image frames processed by the camera 121 may be stored in the memory 160 or may be transmitted to an external device through the radio communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor.

The output unit 150 may generate visual, auditory and/or tactile output and may include the display 151, an audio output module 152, an alarm unit 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor of the sensing unit 140 may be located in an internal region of the mobile terminal 100, surrounded by the touch screen, or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm unit 153 may output a signal for indicating generation of an event of the mobile terminal 100. For example, alarms may be generated when receiving a call signal, receiving a message, inputting a key signal, or inputting touch. The alarm unit 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2A:
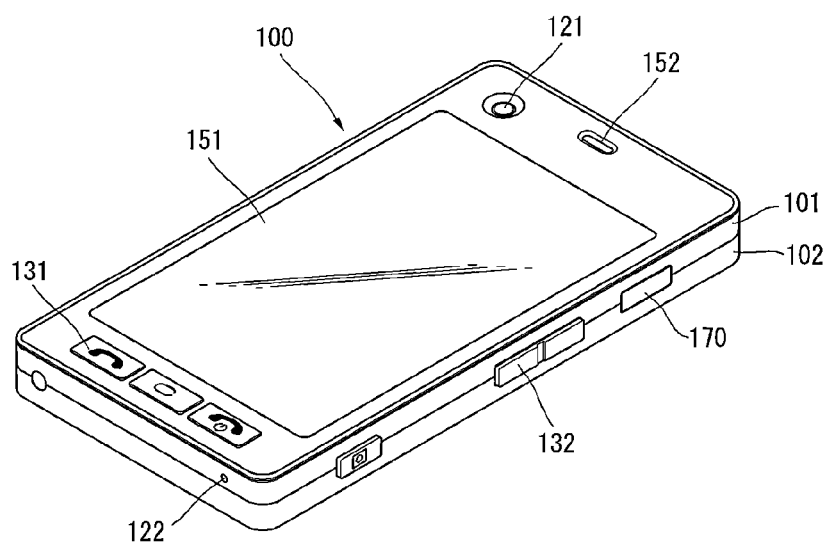
FIG. 2A is a front perspective view of the mobile terminal according to an embodiment of the invention.

FIG. 2A is a front perspective view of a mobile terminal or a handheld terminal 100 according to an embodiment of the invention.

The handheld terminal 100 has a bar type terminal body. However, the invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most of the main face of the front case 101. The audio output unit 152 and the camera 121 are arranged in a region in proximity to one of the ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control the sound volume output from the audio output unit 152 or conversion of the display unit 151 to a touch recognition mode.

Figure 2B:
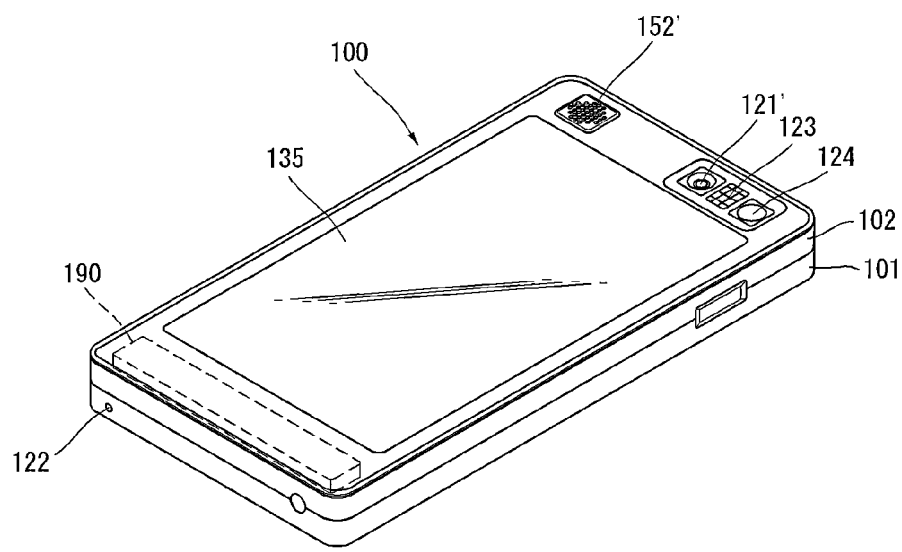
FIG. 2B is a rear perspective view of the mobile terminal according to an embodiment of the invention.

FIG. 2B is a rear perspective view of the handheld terminal shown in FIG. 2A according to an embodiment of the invention.

Referring to FIG. 2B, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151.The touch panel 135 can be identical to or smaller than the display unit 151 in size.

Figure 2D:
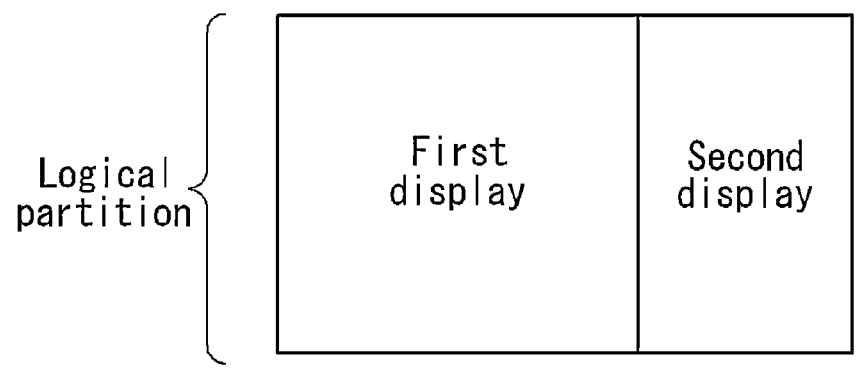

FIGS. 2C and 2D illustrate the mobile terminal 100 and the display 151 according to various embodiments of the present invention.

Referring to FIG. 2C, the display can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body. The sub display is separated from the mobile terminal and detachably combined with the mobile terminal body through an interface to display data from the mobile terminal 100.

The display 151 can include first and second displays which are logically separated from each other in a display panel, as illustrated in FIG. 2D.

Figure 3A:
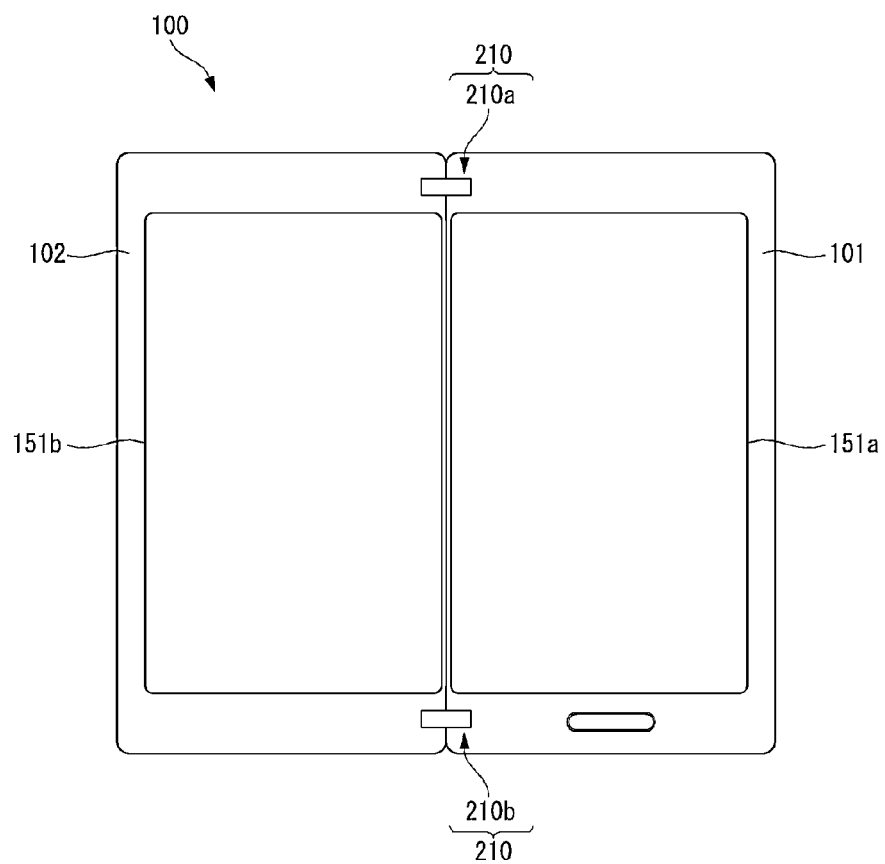
FIGS. 3A and 3B illustrate another implementation of the mobile terminal according to another embodiment of the invention.
Figure 3B:
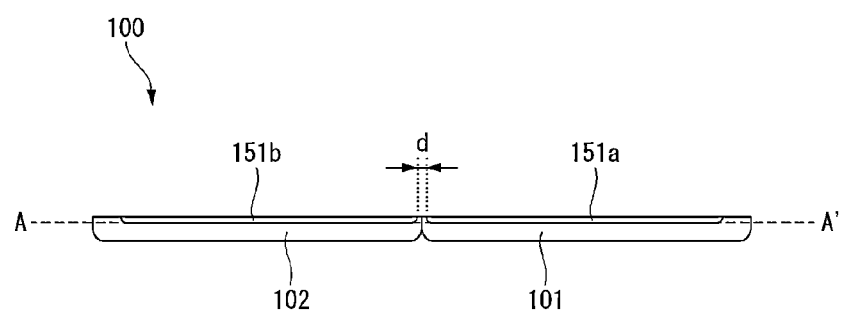

FIGS. 3A and 3B illustrate another implementation of the mobile terminal 100 according to another embodiment of the invention.

Referring to FIG. 3A, a first body 101 and a second body 102 can be independently provided and respectively include a first display 151a and a second display 151b. That is, the first display 151a and the second display 151b can be physically separated from each other. The controller 180 shown in FIG. 1 can display a single image through the first and second displays 151a and 151b or respectively display different images on the first and second displays 151a and 151b. Furthermore, the controller 180 shown in FIG. 1 can logically divide one of the first and second displays 151a and 151b and respectively display images on the divided display areas. For example, the controller 180 shown in FIG. 1 can logically segment the first display 151a into two areas and respectively display different images on the two areas.

A hinge assembly 210 can physically connect the first and second bodies 101 and 102. The first and second bodies 101 and 102 can rotate on the hinge assembly 210. The first and second bodies 101 and 102 can rotate on the hinge assembly 210 to be changed to a closed status from an open status. That is, the mobile terminal 100 in the current embodiment can be in the open status in which sides of the first and second bodies 101 and 102 meet and the closed status in which the first and second displays 151a and 151b come into contact with each other. In addition, the mobile terminal 100 can be in a status between the open status and the closed status. The hinge assembly 210 may include a first assembly 210a located at one side of the first and second bodies 101 and 102 and a second hinge assembly 210b arranged at the other side of the first and second bodies 101 and 102. The first and second bodies 101 and 102 can stably rotate since the first and second hinge assemblies 210a and 210b connect the first and second bodies 101 and 102 at both sides of the first and second bodies 101 and 102.

Referring to FIG. 3B, the first and second bodies 101 and 102 can be arranged coplanar with each other when the mobile terminal 10 is in the open status, and thus the first and second displays 151a and 151b can be coplanar with each other. Accordingly, the user can view an image on a wider screen. Furthermore, if the distance d between the first and second displays 151a and 151b becomes narrow, a degree of discontinuity of the first and second displays 151a and 151b can be reduced, and thus the user can recognize the first and second displays 151a and 151b as a single display. Accordingly, the user can use the mobile terminal 100 more conveniently.

Figure 4:
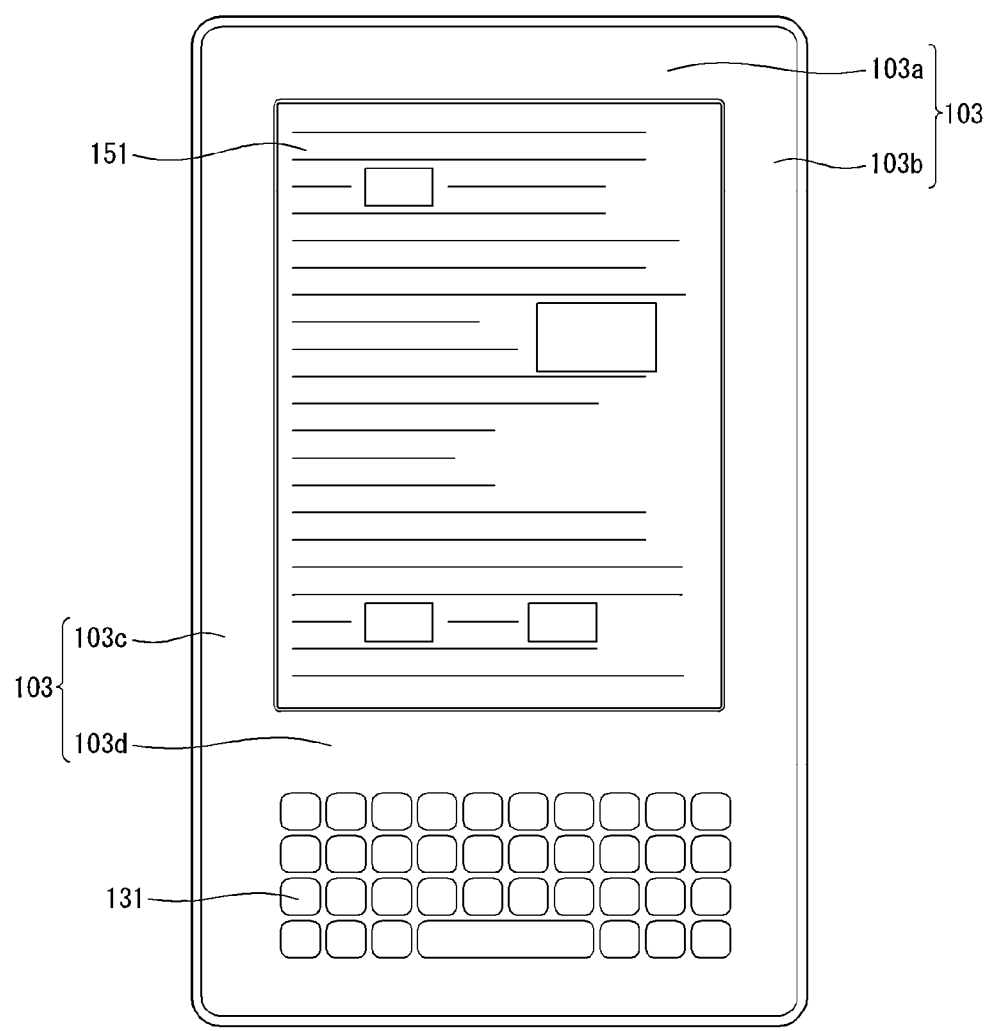
FIG. 4 illustrate another implementation of the mobile terminal according to another embodiment of the invention.

FIG. 4 illustrates another implementation of the mobile terminal 100 according to another embodiment of the invention.

Referring to FIG. 4, the mobile terminal 100 may be an electronic device including a digital book player capable of reading e-book contents.

E-book contents may be a text and image-based publication in digital form produced on, published by and readable on computers or other digital devices. The e-book contents can be distributed through electronic channels such as the Internet, and thus the e-book contents can be provided at a relatively low price and distributed without being restricted by time and place.

The mobile terminal 100 can reproduce e-book contents. If the mobile terminal 100 is only for the digital book player reproducing e-book contents contents, the communication function of the mobile terminal 100 can be omitted. Furthermore, the mobile terminal 100 only for the digital book player can include the display 151 wider than that of a mobile terminal having the communication function as a main function, a bezel 103 formed around the display unit 151 and an operating unit 131.

The display 151 may be a touch screen that displays contents and receives a user's touch input applied to the displayed contents. The display 151 can display various contents in addition to the e-book contents. For example, contents displayed on the display 151 can be multiple contents having the same attribute such as web pages, photos, text messages, phone records, e-mails, phone numbers, music files and video files.

The display 151, that is, the touch screen, may occupy a considerable area of the front side of the mobile terminal 100. The display 151 can display a variety of information items and allow a user to select specific information. The display 151 may be in the form of a combination of a display panel and a touch panel. That is, the display 151 may be constructed in such a manner that a touch panel capable of receiving a touch input is mounted on and combined with a display panel composed of LCD, OLED or the like. Furthermore, the display 151 may be produced with the display panel and the touch panel integrated with each other. Resistive, capacitive, infrared and ultrasonic touch panels can be used for the display unit 151. The capacitive touch panel recognizes a touch input by sensing a variation in the capacitance between conductive layers included therein. The capacitive touch panel includes two conductive layers, a single insulating substrate and a protective layer and may further include a shield layer for increasing a signal-to-noise rate, which is not illustrated in figures. The touch screen 151 may be the output unit 150 shown in FIG. 1 and, at the same time, the input unit 130 shown in FIG. 1 since the touch screen 151 includes the display panel displaying images and the touch panel receiving touch inputs. The display 151 may display contents having multiple layers.

There may be various types of contents. For example, the contents can include e-book contents, music files, picture files, etc. The contents can be represented as multiple layers. That is, the contents can be displayed as if the contents are laminated layers. If the contents correspond to o a book, the book may be constituted of multiple pages and each page can be regarded as a single layer. If the book is opened to a specific page, pages before or after the specific page are covered by the specific page and are not seen. Likewise, when an nth layer is displayed on the display 151, an (n−1)th or (n+1)th layer may not be displayed. More specifically, when the contents correspond to an e-book, each page of the e-book can be regarded as a single layer. Accordingly, when an nth layer corresponding to an nth page of the e-book is displayed on the display 151, an (n+1)th layer corresponding to an (n+1)th page of the e-book may not be displayed. If a control signal is generated according to a user's input or a control operation of the controller 180 shown in FIG. 1, the nth page displayed on the display 151 can be replaced with the (n+1)th page. That is, display of the nth layer can be changed to display of the (n+1)th layer. If the contents are music files, each music file can be regarded as a single layer. If the contents are picture files, each picture file can be regarded as a single layer. The user of the mobile terminal 100 can turn over music files or picture files displayed on the display 151 one by one to display the next music file or next picture file on the display 151.

The bezel 103 may correspond to a part around the display unit 151 in the front side of the mobile terminal 100. The user may use the mobile terminal 100 with a hand gripping the bezel 103. The bezel 103 may have a width greater than that of a conventional mobile terminal. The bezel 103 may include a touch pad. In this case, a user's operation of touching a specific portion of the bezel 103 can be sensed. Accordingly, the user can touch the gripped bezel 103 with a finger to execute a desired function without moving a hand to the display 151 to touch the display 151.

The operating unit 131 may be provided to the surface of the mobile terminal 100. The operating unit 131 may correspond to a single input key or multiple input keys. The operating unit 131 can complement a touch operation performed on the display unit 151 or the bezel 103.

Figure 5:
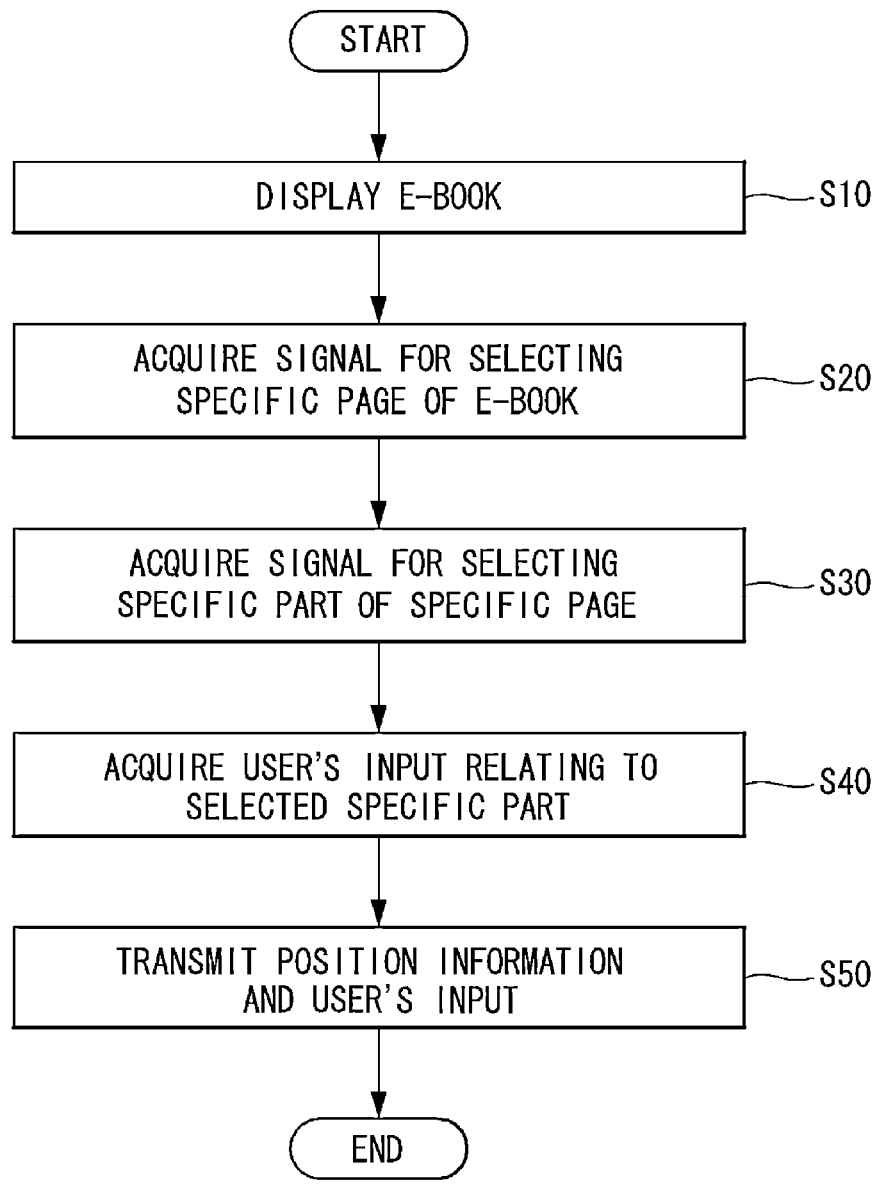
FIG. 5 is a flowchart illustrating an operation of the mobile terminal shown in FIG. 4 according to an embodiment of the invention.

FIG. 5 is a flowchart illustrating an operation of the mobile terminal 100, such as shown in FIG. 4 according to an embodiment of the invention and FIGS. 6, 7, 8 and 9 are views for explaining the operation of the mobile terminal 100, such as shown in FIG. 5.

As shown, the user of the mobile terminal 100 can add comments to a specific part of an e-book EB displayed on the display 151.

The controller 180 shown in FIG. 1 may display the e-book EB in step S10. The e-book EB includes texts and/or images and may be a digital book that can be used through an electronic medium. The e-book EB can be provided at a relatively low price and distributed without being restricted by time and place since the e-book EB can be distributed through electronic channels such as the Internet.

The mobile terminal 100 can reproduce the e-book EB. That is, the mobile terminal 100 can display the e-book EB on the display 151.

A signal for selecting a specific page of the e-book EB may be acquired in step S20.

The e-book EB can borrow part of the characteristics of paper books. For example, the e-book EB is constituted by pages. When the e-book EB composed of pages is displayed on the display 151, the pages can be changed as if the pages are turned over.

Figure 6:
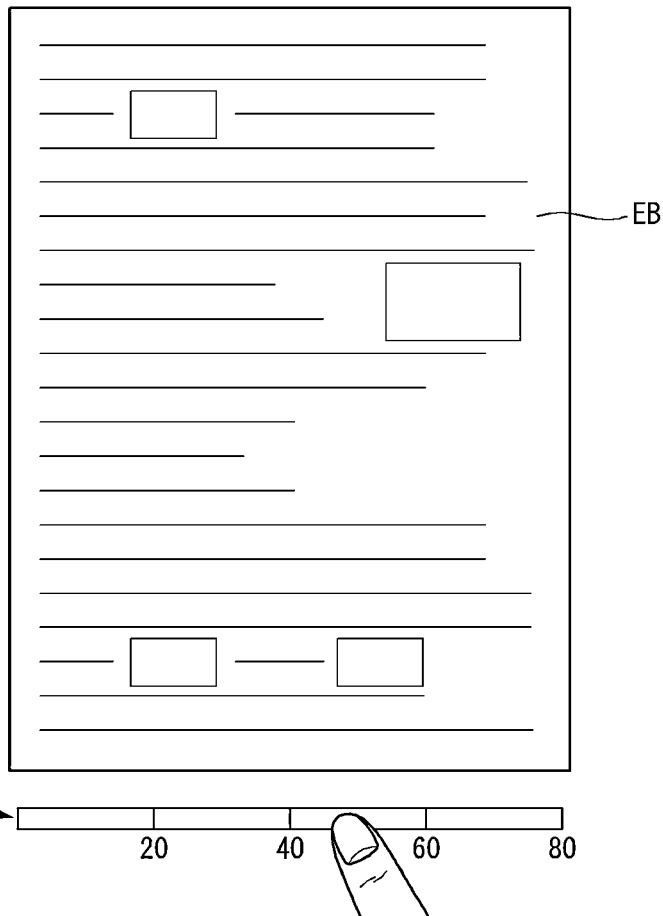
FIGS. 6, 7, 8 and 9 are views for explaining the operation of the mobile terminal, shown in FIG. 5.
Figure 7:
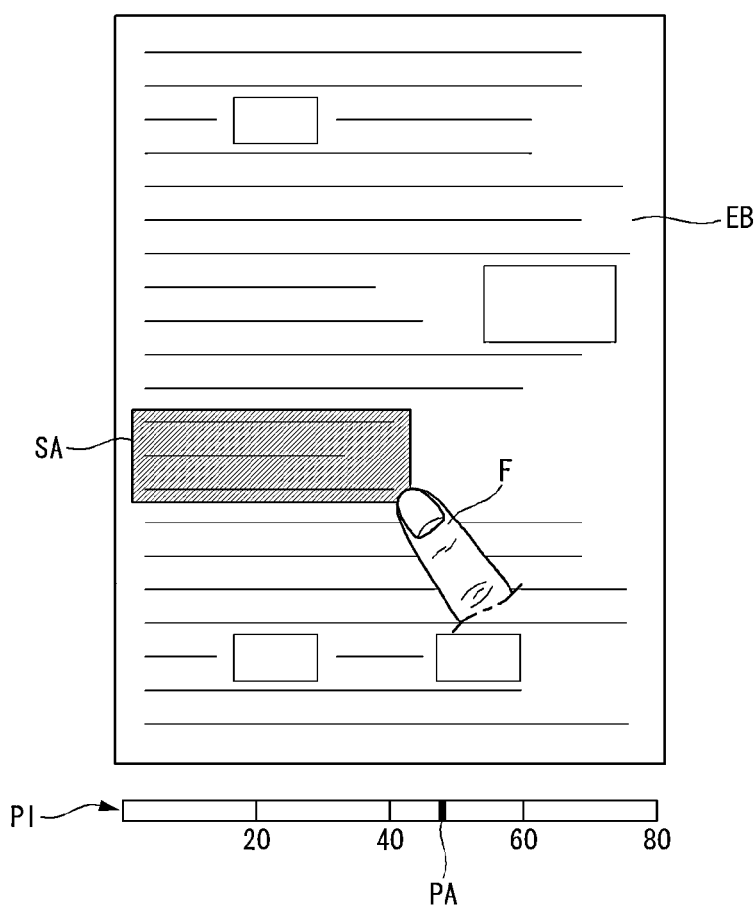

When the e-book EB is constituted by pages, the user can select a specific page that the user wants to read. In this case, the user can select the specific page by touching the e-book EB displayed on the display 151 to a direction of turning over the pages of the e-book EB as if the user turns over pages of a paper book. Furthermore, the user can select the specific page by touching a specific point of an indicator PI displayed at the bottom of the display 151, as shown in FIG. 6, with a finger F. If the user selects a point corresponding to 50 in the indicator PI with the finger F, page 50 of the e-book EB can be displayed on the display 151. The user can directly move to a desired page irrespective of the page currently displayed on the display 151, and thus user convenience can be improved. When the user selects a specific point of the indicator PI, a page indicator PA can be displayed, as shown in FIG. 7. Since the page currently displayed on the display 151 is indicated by the page indicator PA, the user can easily recognize the current page.

A signal for selecting a specific part of the page may be acquired in step S30.

After selecting the specific page using the indicator PI, the user can select a specific part of the page. The specific part may be an area of the page or an area including more than one page. For example, the user can select a point corresponding to page 50 of the e-book EB through the indicator PI and then select lines ten through thirteen of page 50. The user can select the specific part in such a manner that the user respectively touches the start point and the end point of the specific part using the finger F or touches the start point and drags the touch to the end point.

When the specific part is selected through a touch operation, the controller 180 shown in FIG. 1 may display a selected area box SA on the display 151. The selected area box SA can display an area selected by the user such that the area is distinguished from other areas. For example, the selected area box SA can be displayed in a color different from the color of the area around the selected area box SA.

When the specific part of the page is selected, a user's input relating to the selected part may be acquired in step S40.

The user's input may be a user's comment about the specific part of the e-book EB. The comment may be user's estimation and inquiry about the e-book. For example, the comment can be an opinion about the specific part, given by the user who reads the e-book, such that the user shares the opinion with other e-book readers or an inquiry for the writer of the e-book EB about the specific part. This can be clearly understood if the e-book EB is supposed to be home-study materials. That is, a user who is a subscriber of the home-study materials can leave an answer or inquiry about a specific problem in the home-study materials in the form of a comment to communicate with other subscribers or the author.

Figure 8:
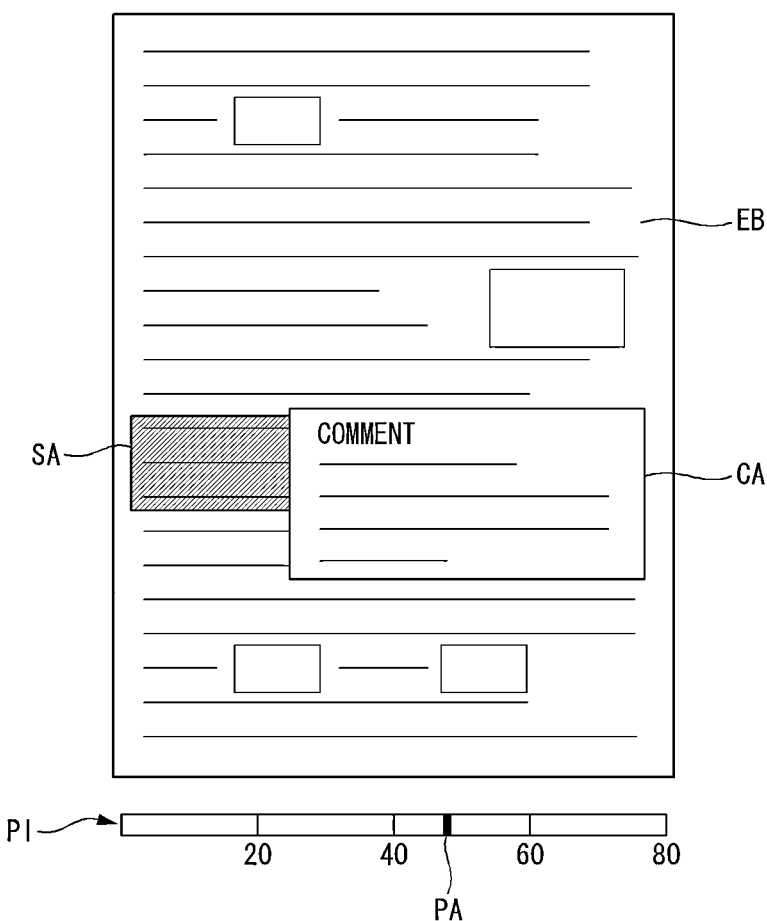

The user's input may be applied through a comment box CA adjacent to the selected area box SA, as shown in FIG. 8. If the selected area box SA is selected though a user's touch, for example, the controller 180 shown in FIG. 1 can display the comment box CA in close proximity to the selected area box SA. When the comment box CA is displayed, the user can input a comment through the comment box CA.

The comment inputted by the user can be part of the e-book. For example, the comment inputted by the user can be displayed in the specific part when the e-book is displayed later. Accordingly, the comment inputted by the user may be a note about the specific part.

Position information and the user's input may be transmitted in step S50.

The position information may be information about the specific part of the e-book EB. For example, the position information can be an nth line of an nth page of the e-book. The user's input may be a comment made by the user at the specific part.

Figure 9:
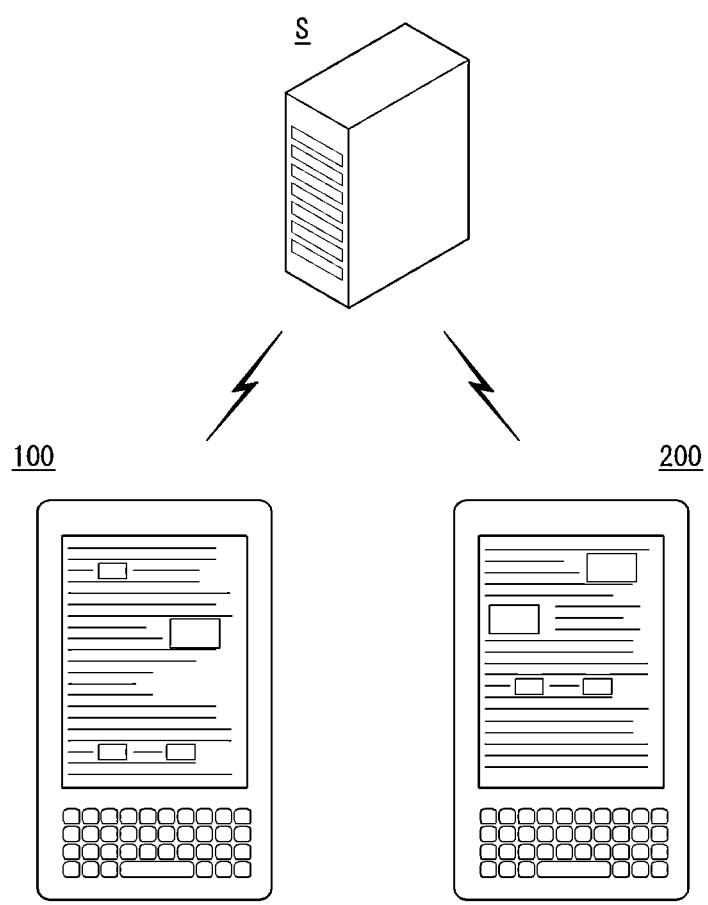

The position information and the user's input may be transmitted to a server S that collects information about the e-book, as shown in FIG. 9. The server S may collect and store information generated by users of the e-book and transmit the information. For example, information uploaded by the user of the mobile terminal 100 to the server S can be transmitted to another mobile terminal 200.

The server S may be accessed by only users who have the authority to access the e-book. For example, only people who bought the e-book can transmit comments to the server S and obtain comments transmitted by users of other mobile terminals. Since only specific users can access the e-book, customers' purchasing need of the e-book can be improved.

Figure 10:
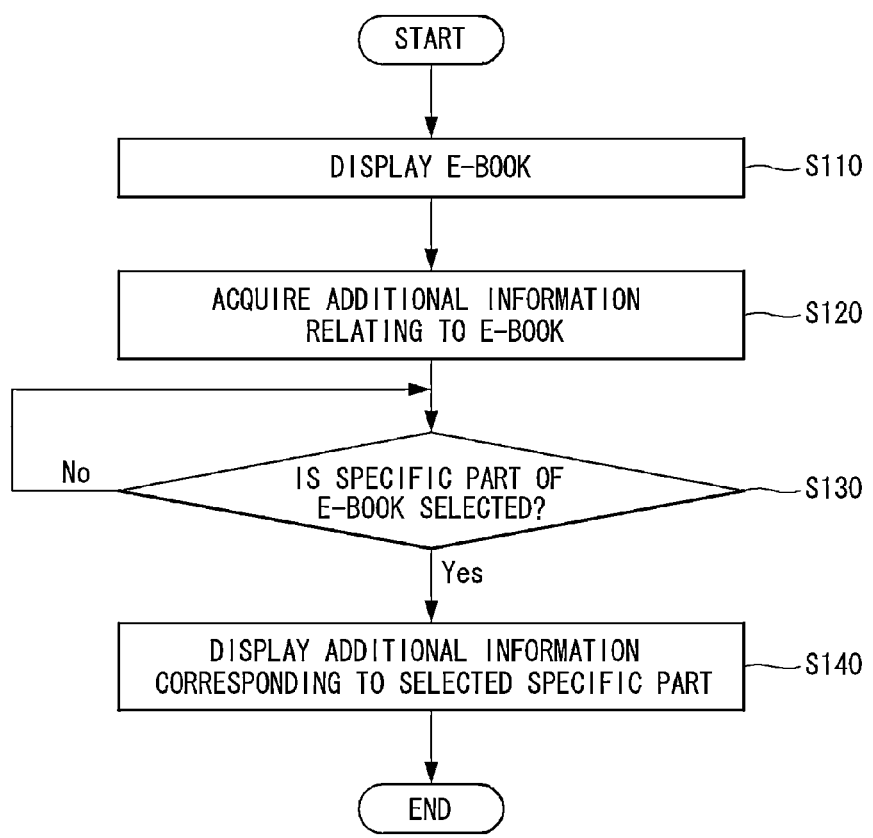
FIG. 10 is a flowchart illustrating an operation of the mobile terminal shown in FIG. 4 according to another embodiment of the invention.
Figure 11:
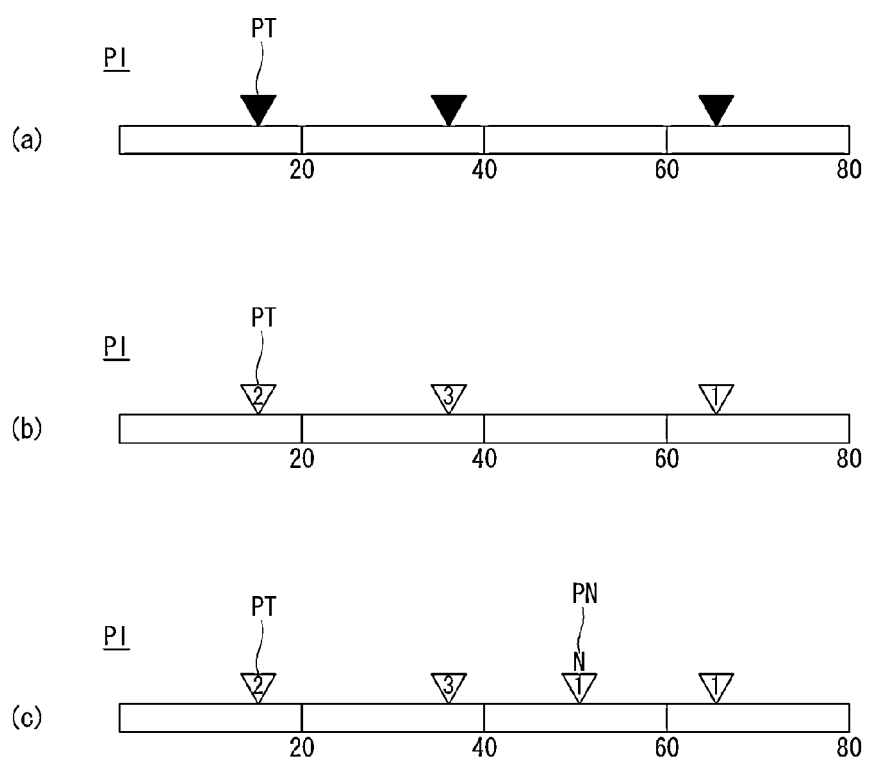
FIG. 11 illustrates various implementations of an indicator indicating a specific part of e-book contents in the operation of the mobile terminal, shown in FIG. 10.
Figure 12:
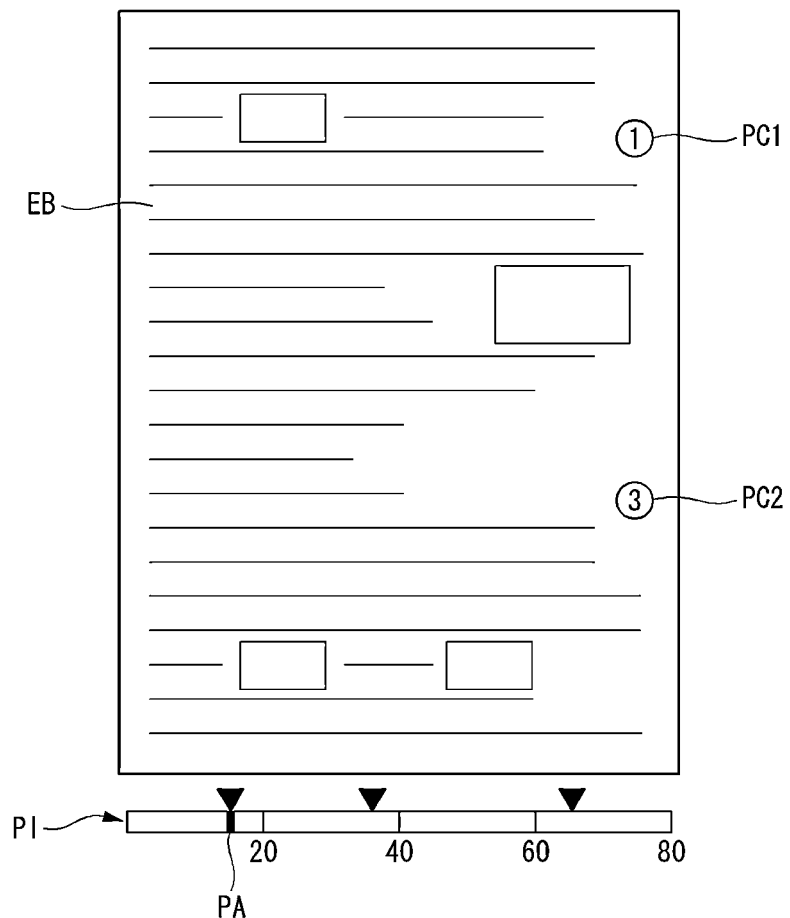
FIGS. 12 and 13 illustrate implementations of displaying additional information in the operation of the mobile terminal, shown in FIG. 10.
Figure 13:
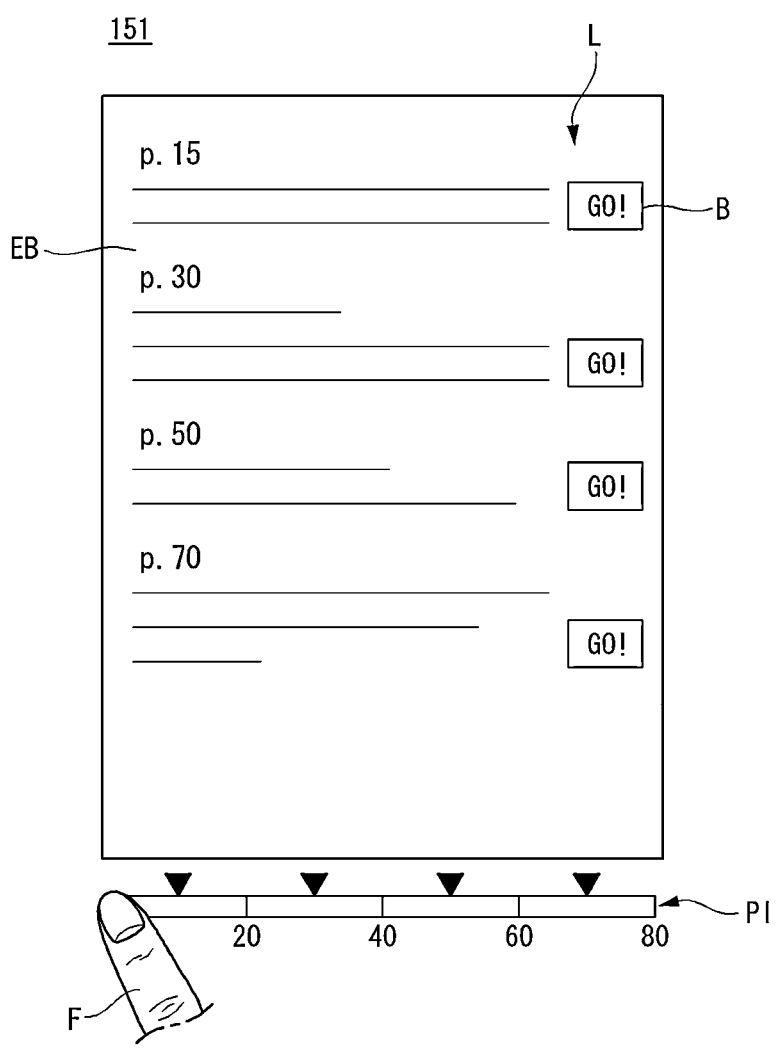

FIG. 10 is a flowchart illustrating an operation of the mobile terminal 100, such as shown in FIG. 4 according to another embodiment of the invention. FIG. 11 illustrates various implementations of the indicator PI that indicates a specific part of the e-book in the operation of the mobile terminal 100, such as shown in FIG. 10, and FIGS. 12 and 13 illustrate various implementations of displaying additional information in the operation of the mobile terminal 100, shown in FIG. 10.

The mobile terminal 100 can receive and display a comment added to the e-book EB.

The controller 180 shown in FIG. 1 may display the e-book EB in step S110 and acquire additional information relating to the e-book EB in step S120.

The additional information may be information about the e-book, which is uploaded to the server S shown in FIG. 9 by the users of the mobile terminal 100 and/or another mobile terminal 200 shown in FIG. 9. For example, the additional information can be a user's inquiry about a specific part of the e-book, as described above.

Referring to FIG. 11, the acquired additional information can be indicated by the indicator PI.

Specifically, the controller 180 shown in FIG. 1 may notify the user of the position of the acquired additional information through a method of indicating the page indicator PT on the indicator PI, as show in FIG. 11(a). The page indicator PT can indicate the page of the e-book on which the additional information acquired from the server S shown in FIG. 9 is located. The page indicator PT may have a triangular shape.

Referring to FIG. 11(b), the page indicator PT may be given a number. The number can represent how many comments are tagged on the page indicated by the page indicator PT. If two comments are tagged on page 25, for example, 2 can be given to the page indicator PT corresponding to page 25. The user of the e-book can be aware of a degree to which other readers are interested in the e-book through the number given to the page indicator PT.

Referring to FIG. 11(c), the controller 180 shown in FIG. 1 may display new comment information PN through the indicator PI. That is, when the other mobile terminal 200 shown in FIG. 9 adds a new comment, the controller 180 shown in FIG. 1 can indicate the new comment information PN to notify the user of the new comment. The user of the mobile terminal 100 can be easily aware of the part of the e-book, which draws the attention of the user of the other mobile terminal 200 shown in FIG. 9, through the new comment information PN.

When a specific part of the e-book EB is selected in step S130, additional information corresponding to the selected specific part may be displayed in step S140.

Referring to FIG. 12, the user can select a specific point of the indicator PI. The selected specific point can be indicated by the page indicator PA.

Comment position indicators PC1 and PC2 may be displayed on the e-book. The comment position indicators PC1 and PC2 can represent that comments are tagged on the positions indicated by the comment position indicators PC1 and PC2. The comment position indicators PC1 and PC2 may further represent the number of comments. That is, when comments of multiple users are tagged on the positions indicated by the comment position indicators PC1 and PC2, the comments can be represented by a number.

When the user selects one of the comment position indicators PC1 and PC2, the comment corresponding to the selected one can be displayed. Here, the comment can be displayed in the form of a pop-up window, as shown in FIG. 8.

The controller 180 shown in FIG. 1 may receive a word or an issue in which the user is interested. If additional information matched to the word or issue in which the user is interested is acquired, the controller 180 shown in FIG. 1 can inform the user of the acquisition of the additional information through at least one of display, vibration and sound.

Displaying the additional information may be restricted according to circumstances. If the user is not a legal e-book purchaser, for example, the additional information may not be displayed or only part of the additional information may be displayed to induce the user to purchase the e-book.

Referring to FIG. 13, comments can be displayed in a specific area of the e-book EB. The specific area may be the first page of the e-book EB. For example, when the user touches the head of the indicator PI with a finger F, acquired comments can be collated and displayed. That is, information about pages to which comments L are added and the comments L can be displayed in order. Furthermore, the controller 180 shown in FIG. 1 can add a button B to each comment L such that the user can move to the page corresponding to the comment L by using the button B.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a communication unit;
   a display configured to display at least part of an electronic book (e-book) contents; and
   a controller configured to:
      transmit position information about the at least part of the e-book contents and a user's input relating to the at least part of the e-book contents to a server through the communication unit to acquire the user's input;
      display an indicator of the e-book contents, the indicator displayed at a bottom of the display separated from the displayed e-book as a horizontal bar shape which corresponds to whole pages of the e-book;
      display a page indicator on the displayed indicator displaying a current page of the e-book contents among the whole pages of the e-book;
      change a displayed page of the e-book contents corresponding to a touch to the displayed indicator;
      display an additional information indicator on the displayed indicator, the additional information indicator comprising at least one of a user's comments about a specific part of the e-book contents and acquired information from a server through the communication unit;
      display a number of comments, the number of comments displayed in the additional information indicator and reflecting a tagged number based on comments by users on the current page; and
      display a new comments indicator, the new comments indicator displayed on a side of the additional information indicator and reflecting newly added comments by users on the current page,
   wherein the additional information indicator is a polygon displayed on the bar shape indicator and the tagged number is displayed in the polygon additional information indicator.

2. The mobile terminal of claim 1, wherein the controller is configured to add the acquired user's input to the e-book contents.

3. The mobile terminal of claim 1, wherein the controller is further configured to display the page corresponding to the specific point on the display.

4. The mobile terminal of claim 1, wherein the server is accessed only by users having authority to access the e-book contents.

5. The mobile terminal of claim 1, wherein the server is configured to acquire input from a plurality of users and add the input the e-book contents.

6. The mobile terminal of claim 3, wherein the indicator provides the position of inputs provided by users.

7. The mobile terminal of claim 6, wherein the indicator provides the number of inputs for each position having inputs by a user.

8. The mobile terminal of claim 6, wherein the indicator provides an indicator for new user inputs.

9. A method of controlling a mobile terminal, comprising:
   displaying electronic book (e-book) contents on a display of the mobile terminal;
   acquiring a user's input relating to at least part of the displayed e-book contents;
   transmitting the user's input with position information about the at least part of the e-book contents to a server;
   displaying an indicator of the e-book contents, the indicator displayed at a bottom of the display separated from the displayed e-book as a horizontal bar shape which corresponds to whole pages of the e-book;
   displaying a page indicator on the displayed indicator displaying a current page of the e-book contents among the whole pages of the e-book;
   changing a displayed page of the e-book contents corresponding to a touch to the displayed indicator;
   displaying an additional information indicator on the indicator, the additional information indicator comprising at least one of a user's comments about a specific part of the e-book contents and acquired information from a server through the communication unit;
   displaying a number of comments, the number of comments displayed in the additional information indicator and reflecting a tagged number based on comments by users on the current page; and
   displaying a new comments indicator, the new comments indicator displayed on a side of the additional information indicator and reflecting newly added comments by users on the current page,
   wherein the additional information indicator is a polygon displayed on the bar shape indicator and the tagged number is displayed in the polygon additional information indicator.

10. The method of claim 9, wherein the indicator displays the number of user's inputs for the specific point.

* * * * *